United States Patent [19]
Wang et al.

[11] Patent Number: 6,150,529
[45] Date of Patent: Nov. 21, 2000

[54] SINGLE SITE CATALYST WITH METHYL ALUMINOXANE OR BORATE FREE AND THEIR APPLICATIONS FOR THE PREPARATION OF POLYOLEFINS

[75] Inventors: Shian-Jy Wang, Hsinchu; Yi-Chun Chen, Taichung; Shu-Hua Chan, Shiann; Jing-Cherng Tsai, Kaoshiung; Ching Ting, Taipei, all of Taiwan

[73] Assignee: Industrial Technology Research Institute, Hsinchu Hsien, Taiwan

[21] Appl. No.: 09/249,511

[22] Filed: Feb. 12, 1999

Related U.S. Application Data

[62] Division of application No. 08/897,862, Jul. 21, 1997, Pat. No. 5,891,816, which is a division of application No. 08/602,206, Feb. 15, 1996, Pat. No. 5,684,098, which is a continuation-in-part of application No. 08/481,113, Jun. 7, 1995, Pat. No. 5,519,099.

[51] Int. Cl.[7] .............................. C07F 19/00; C07F 5/02; C07F 7/00; C07F 17/00
[52] U.S. Cl. .............................. 548/101; 548/110; 556/8; 526/132; 526/352; 526/943; 502/103; 502/117
[58] Field of Search .............................. 556/8; 548/101, 548/110; 502/103, 117; 526/132, 352, 943

[56] References Cited

U.S. PATENT DOCUMENTS

| | | | |
|---|---|---|---|
| 4,870,042 | 9/1989 | Kohara et al. | 502/114 |
| 5,237,069 | 8/1993 | Newman | 548/110 |
| 5,312,794 | 5/1994 | Kelsey | 502/117 |
| 5,519,099 | 5/1996 | Wang et al. | 526/132 |
| 5,684,096 | 11/1997 | Wang et al. | 526/133 |
| 5,891,816 | 4/1999 | Wang et al. | 502/117 |

*Primary Examiner*—Porfirio Nazario-Gonzalez
*Attorney, Agent, or Firm*—W. Wayne Liauh

[57] ABSTRACT

A novel organometallic compound is disclosed which can be used, in conjunction with a trialkyl or bialkyl aluminum cocatalyst, for catalyzing the polymerization and copolymerization of ethylene without requiring the use of either methyl aluminoxane or borate as cocatalyst. The organometallic compound is represented by the formula of $(C_5R_nH_{5-n})(L)MX_aY_b$; wherein: (a) $C_5R_nH_{5-n}$ is a substituted or unsubstituted cyclopentadienyl group, in which n is an integer between 0 and 5, and R is $C_1$ to $C_6$ alkyl group; (b) L is tetrapyrazolyl borate, hydrotrispyrazolyl borate, dihydrobispyrazolyl borate or hydrotris(3,5-dimethylpyrazolyl) borate; (c) M is a Group IIIB, Group IVB, or Group VB transitional metal; (d) a and b are integers such that $a+b=m-2$, where m is the valance of M; and (e) X and Y, which can be the same of different from each other, are halogen atoms or ligands represented by the formula of $ER^1$ or $ER^1R^2$, where E is a Group VA or VIA element, and $R^1$ and $R^2$, which can be the same or different from each other, are $C_1$ to $C_6$ alkyl group or substituted aryl group. Preferably, M is a Group IVB transitional metal and $a=b=1$, and the organometallic compound is then represented by the formula of $(C_5R_nH_{5-n})(L)MXY$.

9 Claims, No Drawings

SINGLE SITE CATALYST WITH METHYL ALUMINOXANE OR BORATE FREE AND THEIR APPLICATIONS FOR THE PREPARATION OF POLYOLEFINS

CROSS-REFERENCE TO RELATED APPLICATIONS

This patent application is a divisional application of application Ser. No. 08/897,862, filed on Jul. 21, 1997, now U.S. Pat. No. 5,891,816, which is a divisional application of application Ser. No. 08/602,206, filed on Feb. 15, 1996, now U.S. Pat. No. 5,684,098, which is a continuation-in-part application of application Ser. No. 08/481,113, filed on Jun. 7, 1995, now U.S. Pat. No. 5,519,099.

FIELD OF THE INVENTION

The present invention relates to a family of novel single-site organometallic compounds for use as catalysts in the production of polyolefins which do not require the use of methyl aluminoxane or borate as a co-catalyst. More specifically, the present invention relates to the preparation of a family of novel single-site organometallic catalysts, and their applications in ethylene polymerization as well as in the copolymerization of ethylene with other α-olefin, or the polymerization of higher alkyl olefins, without having to use methyl aluminoxane or borate as a co-catalyst. The catalysts disclosed in the present invention exhibit excellent catalyst activity and provide controls on the molecular weight and molecular weight distribution of the polymer to be produce.

BACKGROUND OF THE INVENTION

Soluble Ziegler-Natta catalysts, which are often referred to as metallocenes or single site catalysts, are the most commonly employed catalysts in the commercial α-olefin polymerization processes. This is especially true for the production of polyethylene or ethylene/α-olefin copolymers. Metallocenes are bis(cyclopentadienyl) metals, which generally possess a sandwich structure in that the metal is sandwiched between the two cyclopentadienyl groups (both cyclopentadienyl groups bind with the metal atom in π fashion).

A conventional Ziegler-Natta catalyst typically contains a mixture of titanium, vanadium, and/or aluminum complexes. Several shortcomings, however, have been observed with the conventional Ziegler-Natta catalyst in the polymerization or copolymerization of ethylene/α-olefin. These include: relatively broad molecular weight distribution, inadequate light transparency, high content of extractable substance, and relatively low monomer concentration in the polymerization process. The potential use of soluble Ziegler-Natta catalysts to form single active site catalysts for olefin polymerization was first suggested by Breslow and Newburg in J. Am. Chem. Soc., vol. 81, pp81–86 (1959), in which a mixture of a metallocene, bis(cyclopentadienyl) zirconium dichloride, and aluminum alkyl was used as the catalyst. However, the catalyst activity of the single site modified Ziegler-Natta catalyst disclosed by Breslow and Newburg was inferior to the conventional Ziegler-Natta catalysts. It was not until 1980, when Sinn and Kaminsky reported in Advances in Organometallic Chemistry, vol. 18, P123 (1980), in Germany Patents 2,608,933 and 2,608,863, and in European Pat. No. 35242, that bis(cyclopentadienyl) zirconium dichloride can be effectively used, with aluminoxane as a cocatalyst, in the ethylene polymerization processes.

With respect to the use of bis(cyclopentadienyl) metallic compounds as polyethylene catalysts, European Patent App. No. 129368 (1984) ("Eur-368") discloses a catalyst composition comprising bis(cyclopentadienyl) zirconium dichloride as a primary catalyst and methyl aluminoxane as a co-catalyst for ethylene polymerization. The molecular weight of polyethylene obtained using the Eur-368 catalyst can reach 140,000, with a molecular weight distribution of 3.5. European Patent App. No. 128045 (1984) ("Eur-045") discloses a catalyst composition comprising a bis (cyclopentadienyl) zirconium dialkyl and a bis (cyclopentadienyl) titanium dialkyl catalyst for ethylene polymerization. The molecular weight of the polyethylene polymer that can be obtained using the Eur-045 catalyst was increased to 323,000; however, the molecular weight distribution was also increased to 5.51. European Patent App. No. 260999 (1988) ("Eur-999") discloses a catalyst composition comprising bis(n-butylcyclopentadienyl) zirconium chloride as a primary catalyst and methyl aluminoxane as a co-catalyst for ethylene polymerization. The molecular weight of polyethylene obtained using the Eur-999 catalyst can reach 185,000, with a favorable molecular weight distribution of 1.9. However, the Eur-999 catalyst has an activity of only 461 gPE/mmole Zr.hr. European Patent App. No. 226463 (1987) ("Eur-463") discloses the use of bis-(cyclopentadienyl) titanium methyl chloride as a catalyst for ethylene polymerization.

The above examples involved the use of methyl aluminoxane as cocatalyst. The use of a bulky boron-containing anion instead of aluminoxane as a co-catalyst or active agent in ethylene polymerization was first disclosed in European Patent App. No. 277003 and 277004 (1988) ("Eur-003" and "Eur-004"), in which tributylammonium tetra (pentaflurophenyl) borate and 7,8-dicarborane were used as a co-catalyst.

Additionally, Japanese Patent App. No. 63218707 (1988) ("Japan-707") discloses a catalyst (composition for ethylene polymerization; it comprises bis(cyclopentadienyl) titanium dichloride as a primary catalyst and the co-catalyst contains methyl aluminoxane and 1,2-dichloro(ethane. The Japan-707 catalyst was able to improve the catalyst activity in ethylene polymerization to 21,400 gPE/mmole Ti.hr. More recently, European Patent App. No. 384171 (1990) discloses that by using bis(cyclopentadienyl) titanium dichloride and ethyl aluminoxane as catalysts, the catalyst activity in ethylene polymerization can be further improved to 131 KgPE/gTi.hr. In World Patent Application No. WO9109882 (1991), it was disclosed that the molecular weight of polyethylene can be increased to 594,000 with a molecular weight distribution of 2.15, using a catalyst composition that contains bis(cyclopentadienyl) dimethyl chromium and dimethylaniline-tetra(pentafluorophenyl) borate. U.S. Pat. No. 5,258,475 discloses the use of a catalyst composition for ethylene polymerization which contains bis(cyclc, pentadienyl) zirconium dichloride, aluminum trimethyl (i.e., trimethylaluminum), and tributyltin oxide.

Other catalysts have also been disclosed in the prior art which are organometallic compounds containing bis (cyclopentadienyl) and aromatic rings such as indene or fluorene as ligands. In European Patent App. No. 303519 (1987), it is disclosed a catalyst composition containing diindenyl zirconium dichloride, methyl aluminoxane and tetraethyl silicate for use in the copolymerization of ethylene/1-hexene; the catalyst composition exhibited a catalyst activity of 16,801) gPE/gZr.hr. The two indene molecules can be linked together with carbon or silicon atoms, such as the dimethylsilanediyl group (Me$_2$Si), whose use was disclosed in U.S. Pat. No. 4,871,705 (1990), or the isopropyl group, whose use to provide such linkage was disclosed in European Patent App. No. 413326 (1991).

Examples of using fluorene compounds, which contain three rings, as catalyst in ethylene polymerization include those disclosed in European Patent App. No. 530908 (1993), in which bis(cyclopentadienyl) and a fluorene group are π-bonded to a metal atom (zirconium); in European Patent App. No. 528207 (1992), in which an indene group and a fluorene group are π-bonded to a metal atom (zirconium). In both disclosures, the isopropyl group is used to provide the necessary linkage. In Canada Pat. No. 2,067,525 (1992) ("Can-525"), two coordinating fluorene groups are linked to a zirconium compound via an ethylene group to prepare a catalyst for use in ethylene polymerization. With the catalyst disclosed in the Can-525 patent, the molecular weight of the polyethylene prepared can reach 71,900, with a density of 0.97. European Patent App. No. 566988 (1994) discloses the use of fluorene zicornium compounds in the ethylene/5-norbornene copolymerization.

A number of organometallic catalysts containing only mono (cyclopentadienyl) as ligands have also been disclosed. These include the catalyst composition, which contains $C_5Me_4SiMe_2NC(CH_3)_2ZrCl_2$ and methyl alumninoxane, as disclosed in European Patent App. No. 416815 (1991) for use in the copolymerization of ethylene and 4-methyl-1-pentene or 1-hexene; and the catalyst composition, which comprises $CsMe_4SiMe_2NC(CH_3)_2ZrMe_2$ and $PhNMe2H^+B(C_6F_5)_4^-$, as disclosed in WO 9200333 ("WO-333") (1992). With the catalyst composition disclosed in WO-333, the molecular weight of polyethylene can reach 900,000. In U.S. Pat. No. 5,214,173, it is disclosed a catalyst composition for the polymerization of polyethylene which contains $(C_5Me_5)(C_2B_9H_{11})ZrMe$ and triisobutyl-aluminum; the molecular weight of polyethylene produced was 182,000.

SUMMARY OF THE INVENTION

The primary object of the present invention is to develop a novel organometallic compound for use as a catalyst in the polymerization of ethylene and the copolymerization of ethylene with α-olefin, diolefin, acetylenic unsaturated monomers, and cyclic olefins. More specifically, the primary object of the present invention is to develop a novel organometallic compound for use in preparing a catalyst composition, which also contains a trialkyl aluminum or bialky aluminum as cocatalyst but does not require the use of either methyl aluminoxane or bulky boion-containing anion as cocatalyst, for catalyzing ethylene polymerization and copolymerization which can provide high catalyst activity, high polymer molecular weight, narrow molecular weight distribution, high transparency, and/or low extractable content, and can utilize high co-monomer concentration in the copolymerization process. Alternative, the primary object of the present invention is to disclose a catalyst composition, and the processes utilizing the same, which contains the organometallic compound described above and a trialkyl or bialkyl aluminum cocatalyst, for improved polymerization-/copolymerization of ethylene, without the use either methyl aluminoxane or bulky boron-containing anion as a cocatalyst as required in the prior art for high catalyst activity.

The organometallic compound disclosed in the present invention which can be used as a catalyst in the polymerization and copolymerization of ethylene monomers is represented by the formula of $(C_5R_nH_{5-n})(L)MX_aY_b$; wherein:

(a) $C_5R_nH_{5-n}$ is a substituted or unsubstituted cyclopentadienyl group, in which n is an integer between 0 and 5, and R is $C_1$ to $C_6$ alkyl group;

(b) L is tetrapyrazolyl borate, hydrotrispyrazolyl borate, dihydrobispyrazolyl borate or hydrotris(3,5-dimethylpyrazolyl) borate;

(c) M is a Group IIIB, Group IVB, or Group VB transitional metal;

(d) a and b are integers such that a+b=m−2, where m is the valance of M; and (e) X and Y, which can be the same of different from each other, are halogen atoms, or ligands represented by the formula of $ER^1$ or $ER^1R^2$, where E is a group VA or VIA element, and $R^1$ and $R^2$, which can be the same or different from each other, are $C_1$ to $C_6$ alkyl group or substituted aryl group.

Preferably, M is a Group IVB transitional metal and a=b=1, and the organometallic compound is then represented by the formula of $(C_5R_nH_{5-n})(L)MXY$. It is also preferred that at least one of X or Y is a ligand represented by the formula of $ER^1$ or $ER^1R^2$.

An example of the $(C_5R_nH_{5-n})(L)MXY$ compounds disclosed in the present invention which contain a hydrotrispyrazolyl borate group is represented by either Formula I or Formula II below:

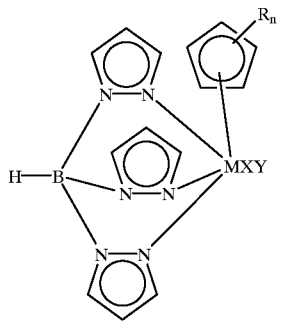

(Formula I)

or

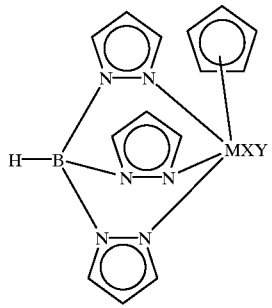

(Formula II)

The $R_n$ in Formula 1 is the same as the $R_n$ in "$C_5R_nH_{5-n}$", in both, the symbol "R" represents a $C_1$ to $C_6$ alkyl group.

Several preferred embodiments of the compounds have been synthesized in the present invention. These include:

(a) $(\eta^5\text{-}C_5H_5)[HB(C_3H_3N_2)_3]Zr(OC_6H_5)_2$;
(b) $(\eta^5\text{-}C_5H_5)[HB(C_3H_3N_2)_3]Zr(OC(CH_3)Cl$;
(c) $(\eta^5\text{-}C_5Me_5)[HB(C_3H_3N_2)_3]Zr(OC_6F_5)_2$; and
(d) $(\eta^5\text{-}C_5H_5)[HB(C_3H_3N_2)_3]Zr(OC_6F_5)_2$.

In the above examples, $\eta^5$—$C_5H_5$ represents a non-substituted cyclopentadienyl group, Me represents a methyl group, $\eta^5$—$C_5Me_5$ represents a substituted cyclopentadienyl group wherein all the hydrogen atoms have been substituted with Me groups, and ($C_3H_3N_2$) represents a pyrazolyl group.

The catalyst composition disclosed in the present invention for catalyzing the polymerization and copolymerization of ethylene preferably also comprises a trialkyl or bialkyl aluminum as cocatalyst. As discussed hereinabove, one of the advantages of the novel compound disclosed in the present invention is that it does not require the use of either methyl aluminoxane or bulky boron-containing anion as cocatalyst.

In the catalyst composition disclosed above, preferably, the alkyl aluminum is provided such that the ratio between the Group IIIB, Group IVB, or Group VB transitional metal atoms and the aluminum atoms would range from 1:15 to 1:1,000.

DETAILED DESCRIPTION OF THE PREFERRED EMBODIMENT

The present invention discloses a novel organometallic compound, which can be used as a catalyst, in conjunction with a trialkyl or bialkyl aluminum cocatalyst, for catalyzing the polymerization of ethylene and the copolymerization of ethylene with other higher α-olefins, diolefin, acetylenic unsaturated monomers, and cyclic olefins, or the polymerization of other higher α-olefins. One of the advantages of the novel compound disclosed in the present invention is that it does not require the use of either methyl aluminoxane or bulky boron-containing anion as cocatalyst, and that high catalyst activity, high polymer molecular weight, narrow molecular weight distribution polyethylenes or copolymers of ethylene can be prepared using the catalyst composition which contains the novel compound disclosed in the present invention as catalyst and the trialkyl or bialkyl aluminum as cocatalyst.

The organometallic compound disclosed in the present invention which can be used as a catalyst in the polymerization and copolymerization of ethylene monomers without requiring either methyl aluminoxane or borate, is represented by the formula of $(C_5R_nH_{5-n})(L)MX_aY_b$; wherein:

(a) $C_5R_nH_{5-n}$ is a substituted or unsubstituted cyclopentadienyl group, in which n is an integer between 0 and 5, and R is $C_1$ to $C_6$ alkyl group;

(b) L is tetrapyrazolyl borate, hydrotrispyrazolyl borate, dihydrotrispyrazolyl borate or hydrotris(3,5-dimethylpyrazolyl) borate;

(c) M is a Group IIIB, Group IVB, or Group VB transitional metal;

(d) a and b are integers such that a+b=m−2, where m is the valance of M; and (e) X and Y, which can be the same of different from each other, are halogen atoms or ligands represented by the formula of $ER^1$ or $ER^1R^2$, where E is a Group VA or VIA element, and $R^1$ and $R^2$, which can be the same or different from each other, are $C_1$ to $C_6$ alkyl group or substituted aryl group.

Preferably, at least one of X or Y is a ligand represented by the formula of $ER^1$ or $ER^1R^2$, M is a Group IVB transitional metal and a=b=1, and the organometallic compound is then represented by the formula of $(C_5R_nH_{5-n})(L)$MXY.

An example of the $(C_5R_nH_{5-n})(L)$MXY compounds disclosed in the present invention which contain a hydrotrispyrazolyl borate group, is represented by one of the two following formulas:

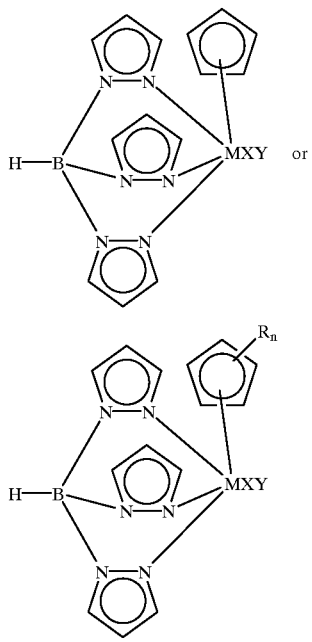

The $R_n$ in Formula 1 is the same as the $R_n$ in "$C_5R_nH_{5-n}$", both represent a $C_1$ to $C_6$ alkyl group.

Several preferred embodiments of the organometallic compounds have been synthesized in the present invention. These include: (a) $(\eta^5$-$C_5H_5)[HB(C_3H_3N_2)_3]Zr(OC_6H_5)_2$; (b)$(\eta^5$-$C_5H_5)[HB(C_3H_3N_2)_3]Zr(OC(CH_3))Cl$; (c) $(\eta^5$-$C_5Me_5)[HB(C_3H_3N_2)_3]Zr()OC_6F_5)_2$; and (d)$(\eta^5$-$C_5H_5)[HB(C_3H_3N_2)_3]Zr(OC_6F_5)_2$. In these examples, $\eta^5$-$C_5H_5$ represents a non-substituted cyclopentadienyl group, Me represents a methyl group, $\eta^5$-$C_5Me_5$ represents a substituted cyclopentadienyl group wherein all the hydrogen atoms have been substituted with Me groups, and ($C_3H_3N_2$) represents a pyrazolyl group.

The present invention also discloses a catalyst composition for catalyzing the polymerization and copolymerization of ethylene; it comprises the a trialkyl or bialkyl aluminum as cocatalyst. As discussed hereinabove, one of the advantages of the novel compound disclosed in the present invention is that it does not require the use of either methyl aluminoxane or bulky boron-containing anion as cocatalyst. In the catalyst composition disclosed above, preferably, the trialkyl or bialkyl aluminum is provided such that the ratio between the Group IIIB, Group IVB, or Group VB transitional metal atoms and the aluminum atoms ranges from 1:15 to 1:1,000.

The catalyst disclosed in the present invention can also be utilized in other processes, such as the polymerization of syndiotactic polystyrene (sPS), syndiotactic polypropylene (sPP), and rubber oxidation.

The present invention will now be described more specifically with reference to the following example. It is to be noted that the following descriptions of example including preferred embodiment of this invention are presented herein for purpose of illustration and description; it is not intended to be exhaustive or to limit the invention to the precise form disclosed.

EXAMPLE 1

Synthesis of $(\eta^5$-$C_5H_5)[HB(C_3H_3N_2)_3]Zr(OC_6H_5)_2$ 1.32 g of $(\eta^5$-$C_5H_5)[HB(C_3H_3N_2)_3]ZrCl_2$ and 0.79 g of $KOC_6H_5$ were mixed in 50 ml of $CH_2Cl_2$. After stirring and reacting at room temperature for 5 hours, the reaction product was filtered to remove the white KCl precipitate. The clear distillate was distilled to remove the $CH_2Cl_2$ solvent, followed by recrystallization with a toluene/pentane mixture solvent to obtain a white solid. The final reaction yield was 66%.

EXAMPLE 2

Synthesis of $(\eta^5-C_5H_5)[HB(C_3H_3N_2)_3]Zr(OC(CH_3))Cl$ 0.22 g of $(\eta^5-C_5H_5)[HB(C_3H_3N_2)_3]ZrCl_2$ and 0.10 g of $NaOC(CH_3)_3$ were mixed in 20 ml of $CH_2Cl_2$. After stirring and reacting at room temperature for 24 hours, the reaction product was filtered to remove the white NaCl precipitate. The clear distillate was distilled under reduced pressure to remove the $CH_2Cl_2$ solvent, followed by recrystallization with a toluene/pentane mixture solvent to obtain a white solid. The final reaction yield was 84%.

EXAMPLE 3

Synthesis of $(\eta^5-C_5Me_5)[HB(C_3H_3N_2)_3]Zr(OC_6F_5)_2$ 0.20 g of $(\eta^5-C_5Me_5)[HB(C_3H_3N_2)_3]ZrCl_2$ and 0.17 g of $NaOC_6F_5$ were mixed in 20 ml of $CH_2Cl_2$. After stirring and reacting at room temperature for 5 hours, the reaction product was filtered to remove the white NaCl precipitate. The clear distillate was distilled under reduced pressure to remove the $CH_2Cl_2$ solvent, followed by recrystallization with a toluene/pentane mixture solvent to obtain 0.25 g of a white solid. The final reaction yield was 78%.

EXAMPLE 4

Synthesis of $(\eta^5-C_5H_5)[HB(C_3H_3N_2)_3]Zr(OC_6F_5)_2$ 0.22 g of $(\eta^5-C_5H_5)[HB(C_3H_3N_2)_3]ZrCl_2$ and 0.21 g of $NaOC_6F_5$ were mixed in 20 ml of $CH_2Cl_2$. After stirring and reacting at room temperature for 5 hours, the reaction product was filtered to remove the white NaCl precipitate. The clear distillate was distilled under reduced pressure to remove the $CH_2Cl_2$ solvent, followed by recrystallization with a toluene/pentane mixture solvent to obtain 0.26 g of a white solid. The final reaction yield was 71%.

EXAMPLE 5

Ethylene Polymerization

A stainless pressure reactor vessel having a capacity of 450 ml was obtained which was provided with five ports at top thereof for connection with a stirrer, a temperature controller, an ethylene feed inlet, a catalyst feed, and a safety valve, respectively. The reactor vessel was thoroughly washed and dried at 110° C. for 8 hours before use. Before charging, nitrogen gas was introduced to purge oxygen from the reactor. The reactor temperature was adjusted to 50° C., then 200 ml of toluene, which had been distilled and degassed, was added. Thereafter, $9.84 \times 10^{-6}$ mole of tributyl aluminum dissolved in 4 ml toluene was charged into the reactor, followed by addition of $1.64 \times 10^{-3}$ mmol of the $(\eta^5-C_5H_5)[HB(C_3H_3N_2)_3]Zr(OC_6H_5)_2$ prepared from Example 1 dissolved in 4 ml toluene. After stirring at 50° C. for 5 minutes, ethylene gas at 150 psig was introduced into the reactor and the reaction was continued for 30 minutes.

After the completion of the polymerization reaction, the ethylene pressure was released. Then 10 ml of isopropanol was charged into the reactor so as to deactivate the catalyst/co-catalyst. After filtration and drying (at 110° C. for 18 hours), a polyethylene product was obtained. The activity of the catalyst was calculated to be $1.72 \times 10^5$ gPE/gZr.hr, and the melting point of the polyethylene product so obtained was measured to be 133° C. The molecular weight of the polyethylene product was measured using Gel Permeation Chromatography to be 174,037, with a molecular weight distribution of 3.08.

EXAMPLE 6

Ethylene Polymerization

The reaction procedure in Example 6 was identical to that described in Example 5, except that the catalyst contained the $(\eta^5-C_5H_5)[HB(C_3H_3N_2)_3]Zr(OC(CH_3))Cl$ obtained from Example 2, instead of $(\eta^5-C_5H_5)[HB(C_3H_3N_2)_3]Zr(OC_6H_5)_2$. The activity of the catalyst was calculated to be $7.2 \times 10^3$ gPE/gZr.hr, and the melting point of the polyethylene product so obtained was measured to be 132° C.

EXAMPLE 7

Ethylene Polymerization

The reaction procedure in Example 7 was identical to that described in Example 5, except that the catalyst contained the $(\eta^5-C_5Me_5)[HB(C_3H_3N_2)_3]Zr(OC_6F_5)_2$ obtained from Example 3, instead of $(\eta^5-C_5H_5)[HB(C_3H_3N_2)_3]Zr(OC_6H_5)_2$. The activity of the catalyst was calculated to be $2 \times 10^3$ gPE/gZr.hr. The molecular weight of the polyethylene product was measured to be 255,483, with a molecular weight distribution of 4.43, and the melting point of the polyethylene product so obtained was measured to be 134° C.

EXAMPLE 8

Ethylene Polymerization

The reaction procedure in Example 8 was identical to that described in Example 5, except that the catalyst contained the $(\eta^5-C_5H_5)[HB(C_3H_3N_2)_3]Zr(OC_6F_5)_2$ obtained from Example 4, instead of $(\eta^5-C_5H_5)[HB(C_3H_3N_2)_3]Zr(OC_6H_5)_2$. The activity of the catalyst was calculated to be $1.44 \times 10^5$ gPE/gZr.hr, and the melting point of the polyethylene product so obtained was measured to be 135° C. The molecular weight of the polyethylene product was measured to be 143,409, with a molecular weight distribution of 3.06.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A compound for use as a catalyst for olefin polymerization, said compound being represented by the formula of

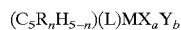

wherein:
(a) $C_5R_nH_{5-n}$ is a substituted or unsubstituted cyclopentadienyl group, n is an integer between 0 and 5, and R is $C_1$ to $C_6$ alkyl group;

(b) L is tetrapyrazolyl borate, hydrotrispyrazolyl borate, dihydrobispyrazolyl borate or hydrotris(3,5-dimethylpyrazolyl) borate;

(c) M is a Group IIIB, Group IVB, or Group VB transitional metal;

(d) a and b are integers such that a+b=m−2, wherein m is the valance of M; and (e) X and Y, which can be the same of different from each other, are halogen atoms or ligands represented by the formula of $ER^1$ or $ER^1R^2$, wherein E is a Group VA or VIA element, and $R^1$ and $R^2$, which can be the same or different from each other, are $C_1$ to $C_6$ alkyl group or substituted aryl group.

2. A compound for use as a catalyst for olefin polymerization according to claim 1 wherein said M is a group IVB transitional metal and both said a and b equal to one.

3. A compound for use as a catalyst for olefin polymerization according to claim 1 wherein at least one said X or Y is a ligand represented by the formula of $ER^1$ or $ER^1R^2$.

4. A compound for use as a catalyst for olefin polymerization according to claim 1 which is represented by one of the following formulas:

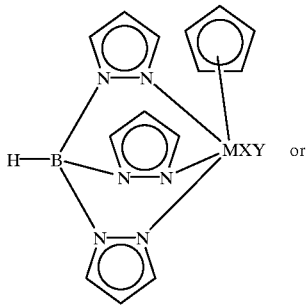 or

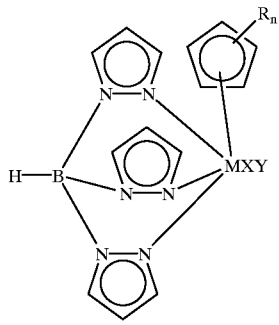

-continued

5. A compound for use as a catalyst for olefin polymerization according to claim 1 which is represented by one of the formulas selected from the group consisting of:

(a) $(\eta^5\text{-}C_5H_5)[HB(C_3H_3N_2)_3]Zr(OC_6H_5)_2$;

(b) $(\eta^5\text{-}C_5H_5)[HB(C_3H_3N_2)_3]Zr(OC(CH_3))Cl$;

(c) $(\eta^5\text{-}C_5Me_5)[HB(C_3H_3N_2)_3]Zr(OC_6F_5)_2$; and (d) $(\eta^5\text{-}C_5H_5)[HB(C_3H_3N_2)_3]Zr(OC_6F_5)_2$;

wherein $\eta^5\text{-}CH_5H_5$ represents a cyclopentadienyl group and Me represents a methyl group.

6. A compound for use as a catalyst for olefin polymerization according to claim 4 which is represented by the formula of $(\eta^5\text{-}C_5H_5)[HB(C_3H_3N_2)_3]Zr(OC_6H_5)_2$.

7. A compound for use as a catalyst for olefin polymerization according to claim 4 which is represented by the formula of $(\eta^5\text{-}C_5H_5)[HB(C_3H_3N_2)_3]Zr(OC(CH_3))Cl$.

8. A compound for use as a catalyst for olefin polymerization according to claim 4 which is represented by the formula of $(\eta^5\text{-}C_5Me_5)[HB(C_3H_3N_2)_3]Zr(OC_6F_5)_2$.

9. A compound for use as a catalyst for olefin polymerization according to claim 4 which is represented by the formula of $(\eta^5\text{-}C_5H_5)[HB(C_3H_3N_2)_3]Zr(OC_6F_5)_2$.

* * * * *